(12) United States Patent
Jozwiak et al.

(10) Patent No.: US 12,387,898 B2
(45) Date of Patent: Aug. 12, 2025

(54) JUMP STUD FUSE MODULE

(71) Applicant: Littelfuse, Inc., Chicago, IL (US)

(72) Inventors: Andrew Jozwiak, San Antonio, TX (US); Jeremy Glessner, Chicago, IL (US)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 18/533,284

(22) Filed: Dec. 8, 2023

(65) Prior Publication Data

US 2025/0191867 A1    Jun. 12, 2025

(51) Int. Cl.
*H01H 85/175* (2006.01)
*H01H 85/10* (2006.01)

(52) U.S. Cl.
CPC .......... *H01H 85/10* (2013.01); *H01H 85/175* (2013.01)

(58) Field of Classification Search
CPC .... H01H 85/10; H01H 85/20; H01H 85/0026; H01H 85/165–1755; H01H 85/2045; H01H 85/22; H01H 85/25; H01H 2085/209; H01R 11/12
See application file for complete search history.

(56) References Cited

U.S. PATENT DOCUMENTS

| | | | |
|---|---|---|---|
| 7,192,319 B1 * | 3/2007 | Rahman | H01H 85/044 439/766 |
| 11,636,994 B2 | 4/2023 | Schwartz | |
| 2004/0018417 A1 * | 1/2004 | Stack | H01M 50/552 429/61 |
| 2009/0023334 A1 * | 1/2009 | Puschkat | H01H 85/2045 439/590 |
| 2011/0285496 A1 * | 11/2011 | Urrea | H01H 85/12 337/188 |
| 2016/0071678 A1 * | 3/2016 | Schwartz | H01H 85/2045 361/115 |
| 2017/0148600 A1 * | 5/2017 | Carnick | H01H 85/0241 |
| 2018/0205188 A1 * | 7/2018 | Urrea | H01H 85/0241 |

OTHER PUBLICATIONS

European Search Report for EP Application No. 24218051.1, dated Apr. 15, 2025, 7 pages.

* cited by examiner

*Primary Examiner* — Jacob R Crum
(74) *Attorney, Agent, or Firm* — KDW Firm PLLC

(57) ABSTRACT

A jump stud assembly including a housing, electrically conductive first and second studs extending through a floor of the housing into a compartment defined by the housing, and a fuse module including a mounting block having a through-hole extending therethrough, a fuse plate having an upper portion on a top of the mounting block and having a through-hole aligned with the through-hole of the mounting block, a lower portion on a bottom of the mounting block and having a through-hole aligned with the through-hole of the mounting block, and a fusible element adjacent a sidewall of the mounting block connecting the upper portion of the fuse plate to the lower portion of the fuse plate, wherein the fuse module is mounted on a portion of the first stud outside the compartment with the upper portion of the fuse plate in electrical communication with the first stud.

17 Claims, 6 Drawing Sheets

JUMP STUD FUSE MODULE

FIELD OF THE DISCLOSURE

The disclosure relates generally to the field of circuit protection devices and relates more particularly to a compact fuse module for providing overcurrent protection at a vehicle's jump studs.

BACKGROUND OF THE DISCLOSURE

In some vehicles, and especially in large vehicles such as cargo trucks, vans, etc., the battery compartment of the vehicle may be difficult or inconvenient to access. This may pose a significant challenge in situations where access to the battery is required, such as for jump starting the vehicle. To alleviate this problem, vehicles are sometimes equipped with so-called "jump studs" (sometimes referred to as "junction posts" or "jump start battery feed studs"), which are electrically conducive posts or terminals that are connected to, but located remote from, the positive and negative terminals of a vehicle's battery and that are installed in a convenient, readily accessible location. For example, jump studs may be located within an easily accessible compartment located on an exterior of a vehicle or within a cabin of a vehicle.

As with any exposed electrical junction, jump studs may be susceptible to overcurrent conductions (e.g., short circuits, arc faults, etc.) which could cause significant damage to a vehicle's battery and/or to surrounding components if allowed to persist. It is therefore desirable to implement overcurrent protection at the jump studs to prevent or mitigate such damage. It is also desirable to implement such overcurrent protection in a robust, compact form factor. It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A jump stud assembly in accordance with an exemplary embodiment of the present disclosure may include a housing, electrically conductive first and second studs extending through a floor of the housing into a compartment defined by the housing, and a fuse module including a mounting block having a through-hole extending therethrough, a fuse plate having an upper portion on a top of the mounting block and having a through-hole aligned with the through-hole of the mounting block, a lower portion on a bottom of the mounting block and having a through-hole aligned with the through-hole of the mounting block, and a fusible element adjacent a sidewall of the mounting block connecting the upper portion of the fuse plate to the lower portion of the fuse plate, wherein the fuse module is mounted on a portion of the first stud outside the compartment with the upper portion of the fuse plate in electrical communication with the first stud.

A jump stud assembly in accordance with another exemplary embodiment of the present disclosure may include a housing, electrically conductive first and second studs extending through a floor of the housing into a compartment defined by the housing, a removable cover enclosing the compartment, a fuse module including a mounting block having a through-hole extending therethrough, a fuse plate having an upper portion on a top of the mounting block and having a through-hole aligned with the through-hole of the mounting block, a lower portion on a bottom of the mounting block and having a through-hole aligned with the through-hole of the mounting block, and a fusible element adjacent a sidewall of the mounting block connecting the upper portion of the fuse plate to the lower portion of the fuse plate, wherein the fuse module is mounted on a portion of the first stud outside of the compartment, with the first stud extending through the through-holes of the upper portion of the fuse plate, the mounting block, and the lower portion of the fuse plate, and with the upper portion of the fuse plate in electrical communication with the first stud, and a ring terminal of an electrical conductor disposed on the first stud in electrical contact with the lower portion of the fuse plate.

A jump stud assembly in accordance with another exemplary embodiment of the present disclosure may include a housing, electrically conductive first and second studs extending through a floor of the housing into a compartment defined by the housing, and a fuse module including a mounting block having a through-hole extending therethrough, a fuse plate having an upper portion on a top of the mounting block and having a through-hole aligned with the through-hole of the mounting block, a lower portion on a bottom of the mounting block and having a through-hole aligned with the through-hole of the mounting block, and a fusible element adjacent a sidewall of the mounting block connecting the upper portion of the fuse plate to the lower portion of the fuse plate, wherein the fuse module is mounted to the first stud outside of the compartment, with an electrically insulated bolt extending through the through-holes of the lower portion of the fuse plate, the mounting block, and the upper portion of the fuse plate, and threadedly engaging a threaded aperture of the first stud, with the upper portion of the fuse plate in electrical communication with the first stud.

DETAILED DESCRIPTION

A jump stud fuse module in accordance with the present disclosure will now be described more fully with reference to the accompanying drawings, in which preferred embodiments of the jump stud fuse module are presented. It will be understood, however, that the jump stud fuse module may be embodied in many different forms and should not be construed as being limited to the embodiments set forth herein. Rather, these embodiments are provided so that this disclosure will convey certain exemplary aspects of the jump stud fuse module to those skilled in the art.

Figure 1A:
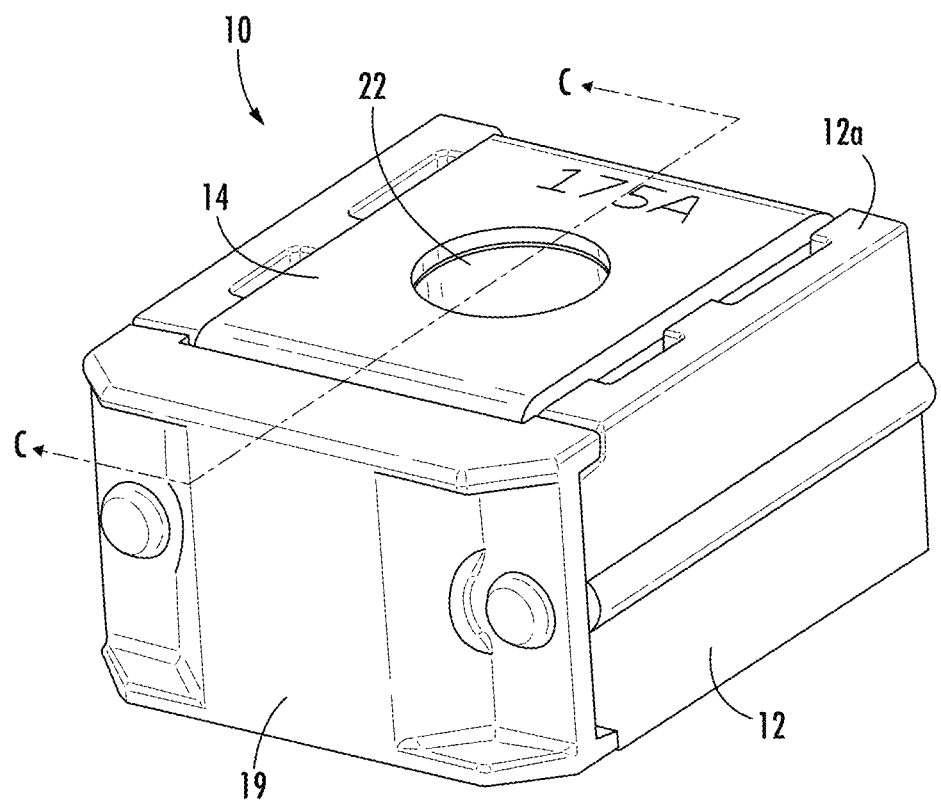
FIG. 1A is a perspective view illustrating a fuse module in accordance with an exemplary embodiment of the present disclosure.

Referring to FIG. 1, a perspective view illustrating a jump stud fuse module 10 (hereinafter "the fuse module 10") in accordance with an exemplary, non-limiting embodiment of the present disclosure is shown. As will be described in greater detail below, the fuse module 10 may be coupled directly to a jump stud of a vehicle with no flexible electrical conductors extending therebetween and may provide overcurrent protection for a vehicle's battery. Advantageously, the fuse module 10 is provided in a compact, space-saving form factor that is amenable to convenient installation and removal.

For the sake of convenience and clarity, terms such as "front," "rear," "top," "bottom," "above," "below," "vertical," "horizontal," etc. may be used herein to describe the relative placement and orientation of various components of the fuse module 10, each with respect to the geometry and orientation of the fuse module 10 as it appears in FIG. 1. Said terminology will include the words specifically mentioned, derivatives thereof, and words of similar import.

Figure 1B:
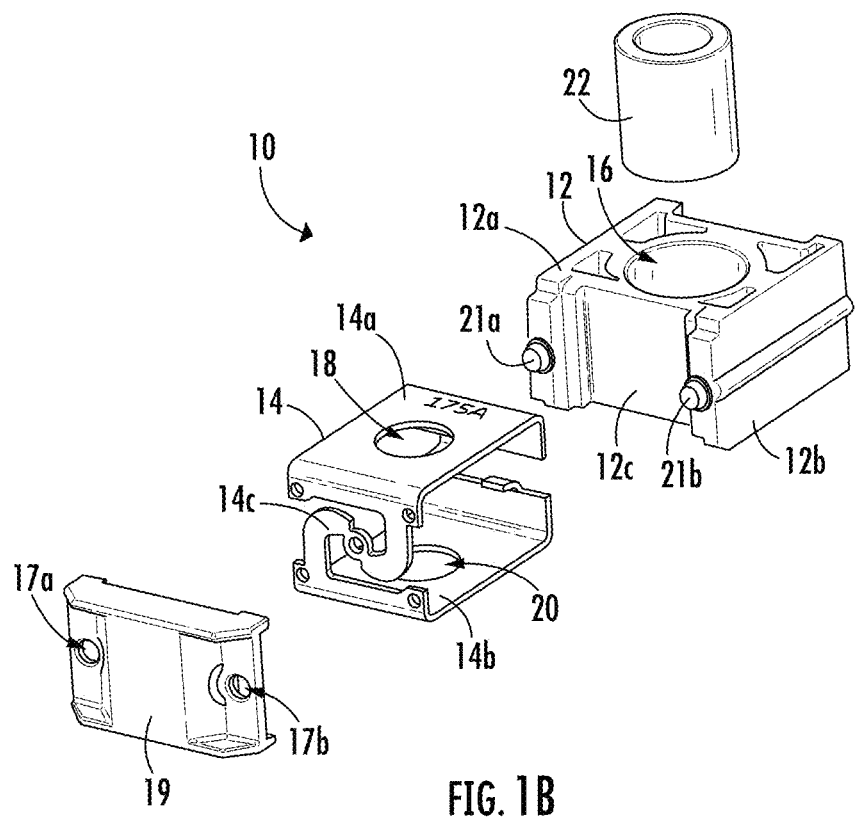
FIG. 1B is an exploded view illustrating components of the fuse module shown in FIG. 1.
Figure 1C:
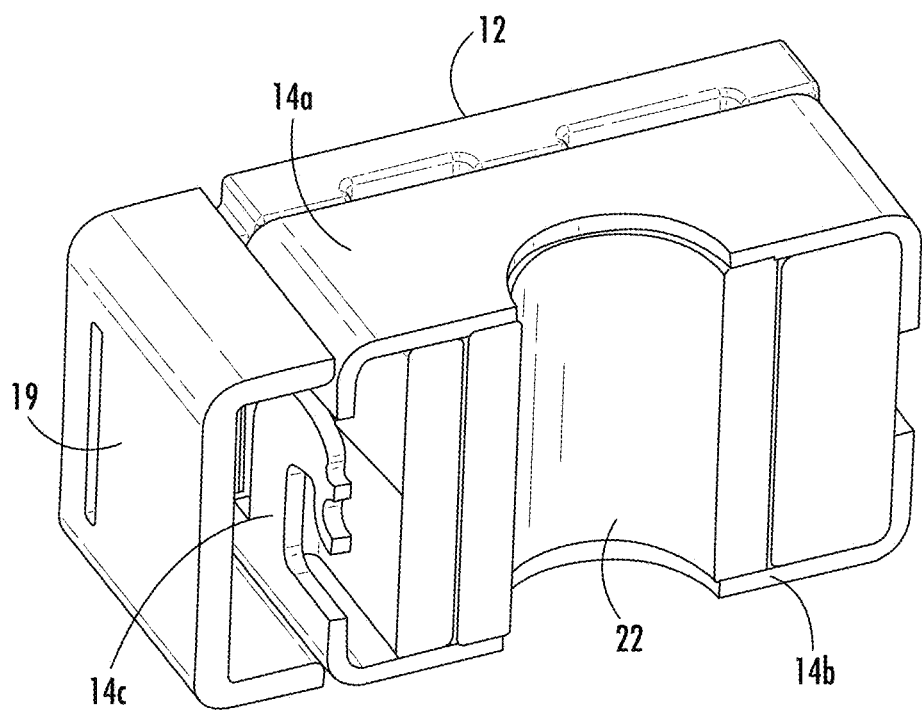
FIG. 1C is a cross sectional view of the fuse module shown in FIG. 1 taken along plane C-C.

Referring to the exploded and cross-sectional views shown in FIGS. 1B and 1C, respectively, the fuse module 10 may include a mounting block 12 and a fuse plate 14 that extends around several surfaces of the mounting block 12. Particularly, the fuse plate 14 may include an upper portion 14a disposed on a top surface 12a of the mounting block 12, a lower portion 14b disposed on a bottom surface 12b of the mounting block 12, and a fusible element 14c disposed adjacent a sidewall 12c of the mounting block 12 and connecting the upper portion 14a to the lower portion 14b. The mounting block 12 may include a through-hole 16 extending vertically therethrough. The upper and lower portions 14a, 14b of the fuse plate 14 may each have through-holes 18, 20 that are aligned with (e.g., concentric with) the through-hole 16 of the mounting block 12. The mounting block 12 may be formed of an electrically insulative, preferably lightweight material (e.g., any suitable plastic, polymer, composite, etc.). The fuse plate 14 may be formed of any suitable electrically conductive material conventionally used in fuse applications (e.g., copper, tin, etc.).

The fusible element 14c of the fuse plate 14 may be mechanically weakened relative to other portions of the fuse plate 14 so that the fusible element 14c will melt and separate upon the occurrence of an overcurrent condition in the fuse module 10. For example, the fusible element 14c may be narrower or thinner than other portions of the fuse plate 14. The present disclosure is not limited in this regard. In various embodiments, the fusible element 14c may be perforated, notched, slotted, or otherwise structurally weakened to facilitate separation of the fusible element 14c if an amount of current flowing through the fuse plate 14 exceeds a predefined threshold ("current rating").

The fuse module 10 may further include an electrically insulative cover 19 that fits over the fusible element 14c and that is affixed to the sidewall 12c of the mounting block 12. The cover 19 may be provided for shielding the fusible element 14c from environmental contaminants (e.g., ambient particulate) and containing electrical arcing that may occur upon separation of the fusible element 14c. As illustrated, the cover 19 may include mounting holes 17a, 17b that are configured to matingly engage corresponding mounting posts 21a, 21b extending from the sidewall 12c (e.g., via friction fit, snap fit, etc.). The present disclosure is not limited in this regard. In various embodiments the cover 19 may be affixed to the mounting block 12 using any other suitable means, including, but not limited to, mechanical fasteners, adhesives, etc.

The fuse module 10 may further include a torque limiting cuff 22 disposed within the through-hole 16 of the mounting block 12 in a substantially coaxial relationship therewith. The torque limiting cuff 22 may be a tubular member formed of a rigid, electrically insulative material (e.g., ceramic) that extends between the upper portion 14a and the lower portion 14b of the fuse plate 14. The torque limiting cuff 22 may provide a hard stop to prevent the upper portion 14a and the lower portion 14b from being bent or deflected toward one another beyond a prescribed distance during installation of the fuse module 10 as further described below. In various embodiments, the opposing ends of the torque limiting cuff 22 may be substantially coplanar with the top surface 12a and bottom surface 12b of the mounting block 12, respectively as shown in FIG. 1C. The present disclosure is not limited in this regard, and in various embodiments the torque limiting cuff 22 may be entirely omitted from the fuse module 10.

Figure 2A:
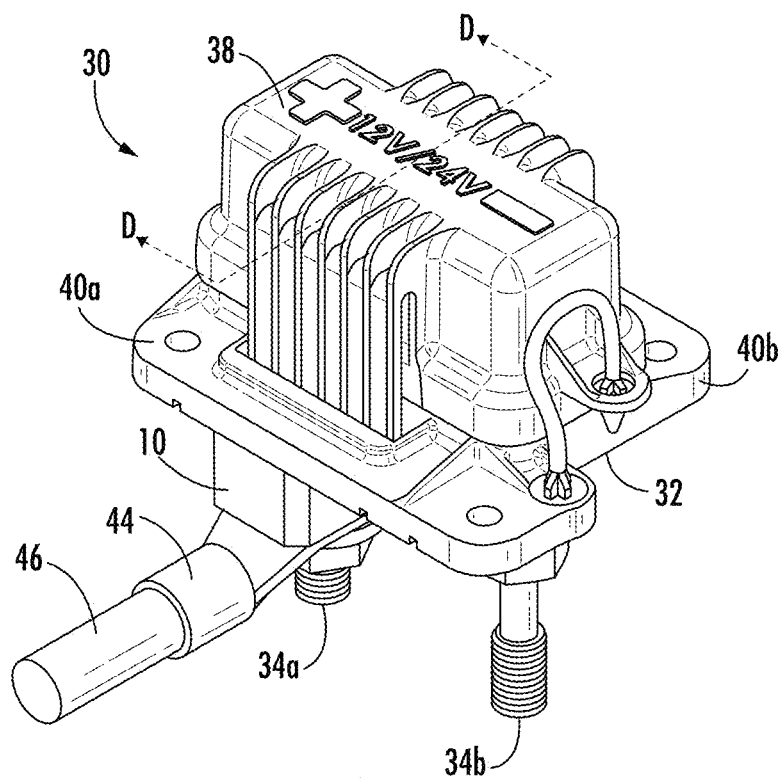
FIG. 2A is a top perspective view illustrating a jump stud assembly in accordance with an exemplary embodiment of the present disclosure.
Figure 2B:
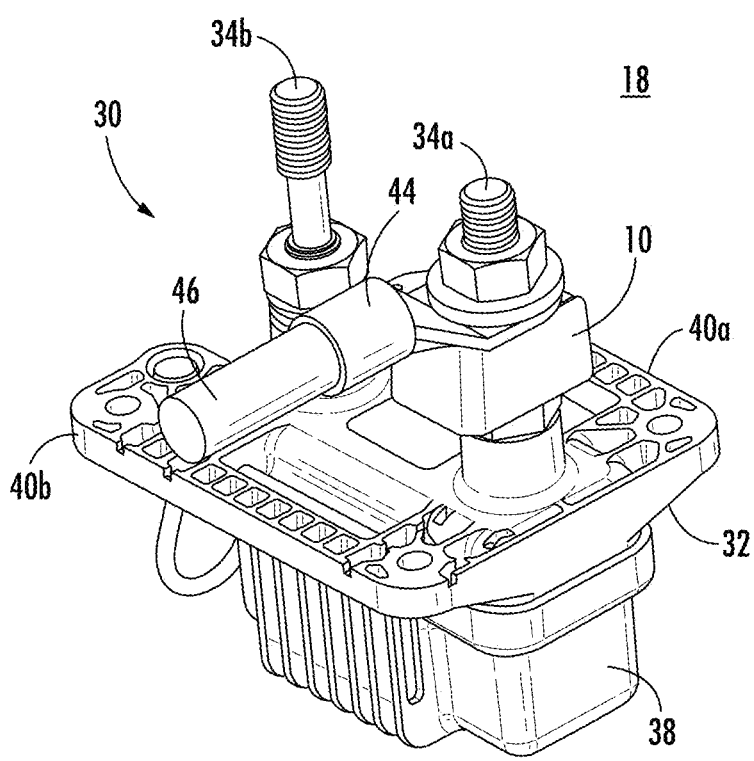
FIG. 2B is a bottom perspective view illustrating the jump stud assembly shown in FIG. 2A.
Figure 2C:
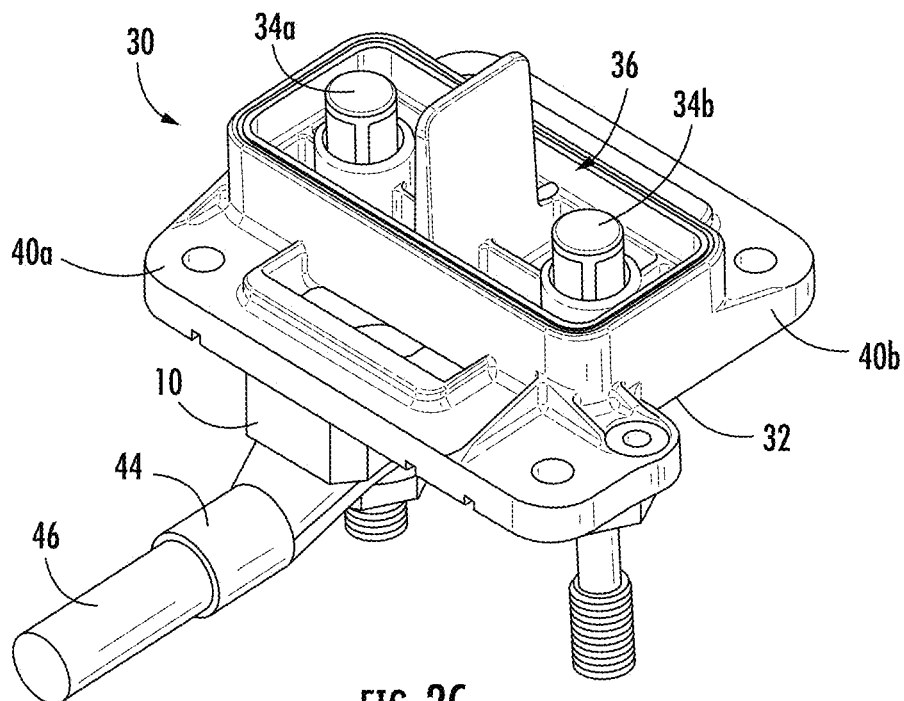
FIG. 2C is a top perspective view illustrating the jump stud assembly shown in FIG. 2A with the cover omitted for clarity.
Figure 2D:
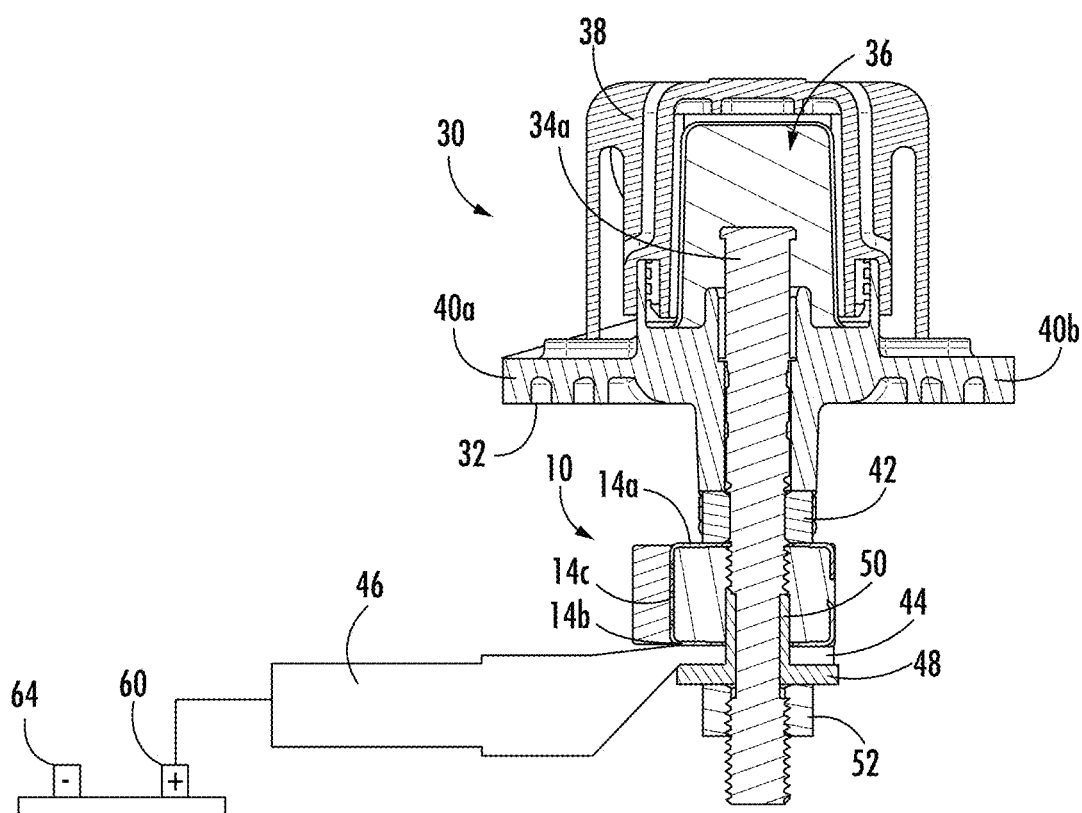
FIG. 2D is a cross sectional view illustrating the jump stud assembly shown in FIG. 2A taken along plane D-D.

Referring to FIGS. 2A-2E, the fuse module 10 is shown operatively installed as part of a jump stud assembly 30. Apart from the fuse module 10, the jump stud assembly 30 may be of a conventional variety familiar to those of skill in the art and may include a housing 32, electrically conductive first and second studs or posts 34a, 34b extending through a floor of the housing 32 and into a compartment 36 defined by the housing 32 (as best shown in FIGS. 2C and 2D), and a removable cover 38 enclosing the compartment 36 (the removable cover 38 is omitted from FIG. 2C for clarity). Thus, when the cover 38 is opened or removed, the upper ends of the first and second studs 34a, 34b may be accessible via the open top of the compartment 36 for allowing jumper cables (not pictured) to be connected to the first and second studs 34a, 36b, for example. The housing 32 may include mounting flanges 40a, 40b with mounting holes formed therein for facilitating mounting of the jump stud assembly 30 to a vehicle with mechanical fasteners. The present disclosure is not limited in this regard.

Referring to FIG. 2D, the fuse module 10 may be installed on a lower portion of the first stud 34a, below the floor of the housing 32, with the first stud 34a extending through the through-hole 16 of the mounting block 12. An electrically conductive first nut 42 may be secured to the first stud 34a (e.g., via threaded engagement) and may be sandwiched between the housing 32 and the upper portion 14a of the fuse plate 14. A ring terminal 44 of an insulated conductor 46 may be disposed in engagement with the lower portion 14b of the fuse plate 14 and may be sandwiched between the lower portion 14b and an electrically insulating ferrule 48. The ferrule 48 may have a planar portion 49 disposed in flat engagement with the lower portion 14b, and a tubular shank 50 that extends axially through the ring terminal 44 and the lower portion 14b of the fuse plate 14 and into the torque limiting cuff 22. The first nut 42, the fuse module 10, the ring terminal 44, and the ferrule 48 may be secured together in a stacked arrangement in the aforementioned order by a second nut 52 that threadedly engages the lower end of the first stud 34a. The torque limiting cuff 22 of the fuse module 10 may prevent over-tightening of the second nut 52 that could otherwise crush or crack the mounting block 12.

Figure 2E:
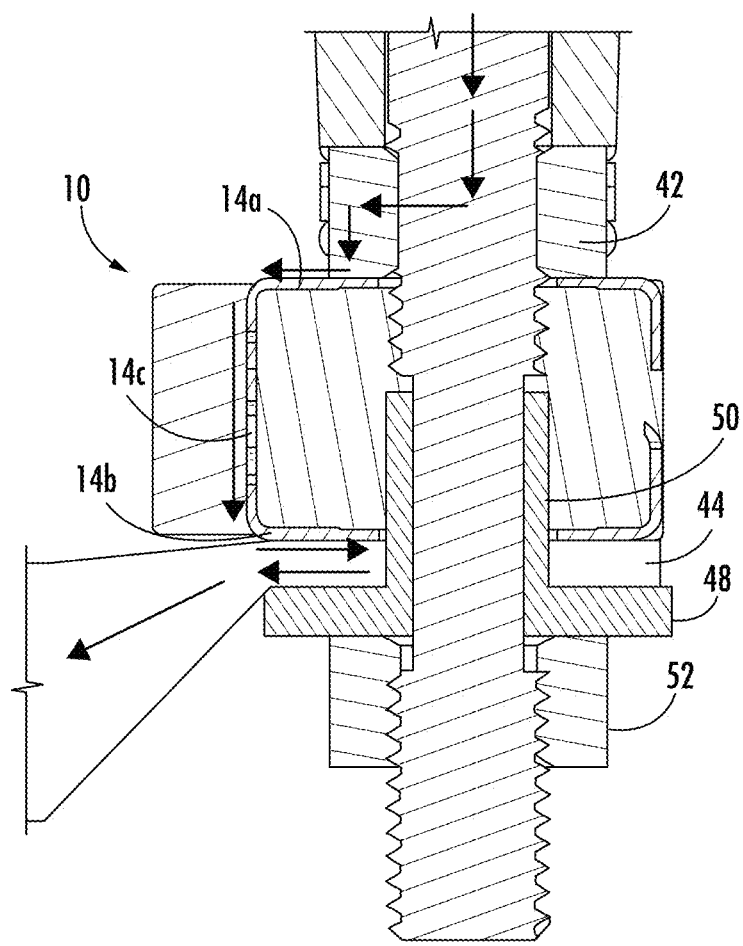
FIG. 2E is a detailed cross-sectional view illustrating the jump stud assembly shown in FIG. 2A taken along plane D-D illustrating a current path through the jump stud assembly.

With the jump stud assembly 30 arranged in the manner described above, a current path through the jump stud assembly 30 is established that is indicated by the arrows shown in FIG. 2E. Specifically, current may flow into the first stud 34a (e.g., from a jumper cable clamped to the first stud 34a), through the upper portion 14a of the fuse plate 14, through the fusible element 14c, though the lower portion 14b of the fuse plate 14, into the ring terminal 44 of the insulated conductor 46, and on to a load (e.g., a positive terminal 60 of a vehicle battery 62, see FIG. 2D) that may be connected to an opposing end of the insulated conductor 46. Of course, current may flow in the opposite direction as well. Notably, the ferrule 48, which is formed of an electrically insulating material (e.g., plastic, rubber, ceramic, etc.) may provide an electrically insulating barrier that prevents current from flowing from the first stud 34a or the second nut 52 into the lower portion 14b of the fuse plate 14 or the ring terminal 44, thus forcing current to flow through the fusible element 14c instead of shorting through the first stud 34a. Thus, in the case of an overcurrent condition wherein an amount of current flowing through the fuse module 10 exceeds the current rating of the fuse module 10, the fusible element 14c will melt and separate, thereby arresting current flowing through the jump stud assembly 30. The fuse module 10 thereby protects a connected load from overcurrent conditions that could otherwise cause damage to the load if allowed to persist.

In various embodiments, the insulated conductor 46 may extend to, and may be connected to, a positive terminal 60 of a vehicle battery 62 as schematically shown in FIG. 2D. Though not shown, those of ordinary skill in the art will appreciate that another insulated conductor may be connected to the second stud 34b and may extend to, and may be connected to, a negative terminal 64 of the vehicle battery 62. Additionally, various embodiments of the jump stud assembly 30 are contemplated in which another fuse module that is substantially identical to the fuse module 10 may be installed on the second stud 34b. The present disclosure is not limited in this regard.

Figure 3:
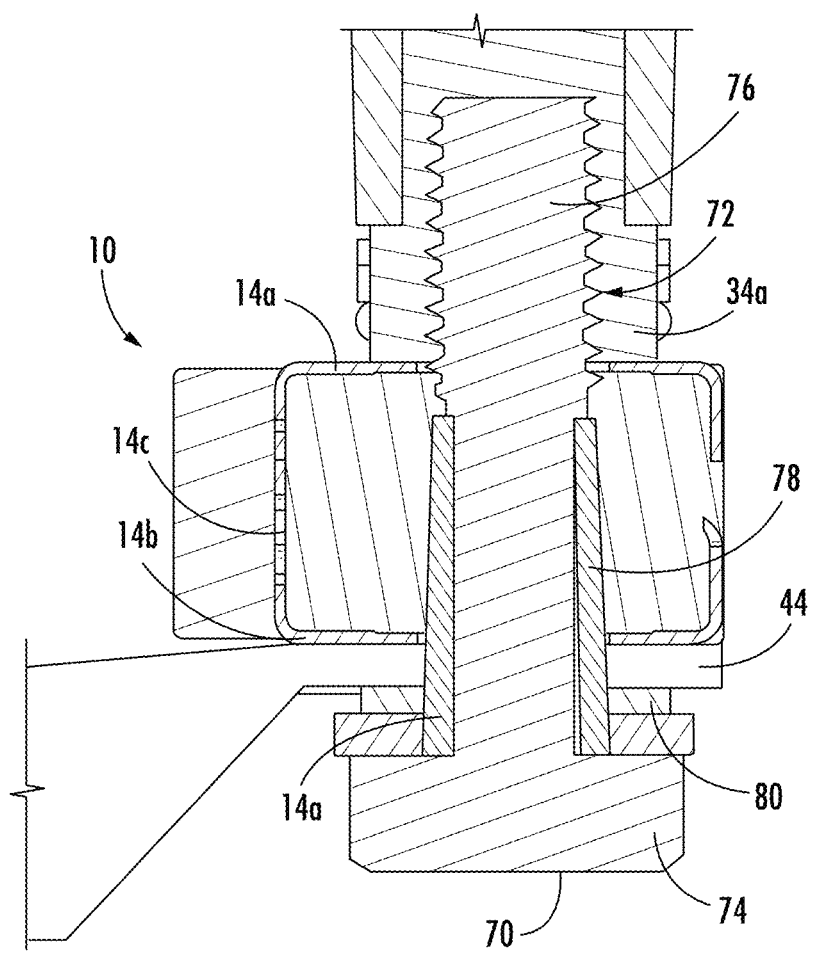
FIG. 3 is a detailed cross-sectional view illustrating a jump stud assembly in accordance with an exemplary alternative embodiment of the present disclosure.

Referring to FIG. 3, a detailed cross-sectional view illustrating an alternative embodiment of the jump stud assembly 30 is shown. The embodiment shown in FIG. 3 is generally similar to the jump stud assembly 30 described above and shown in FIGS. 2A-2E but may include an insulated bolt 70 for fastening the ring terminal 44 and the fuse module 10 to the first stud 34a. Particularly, the first stud 34a may have a threaded aperture 72 formed in a lower end thereof. The insulated bolt 70 may extend through the ring terminal 44 and the fuse module 10 and may threadedly engage the threaded aperture 72, thus holding the ring terminal 44 in secure engagement with the lower portion 14b of the fuse plate 14 and holding the upper portion 14a of the fuse plate 14 in secure engagement with the first stud 34a.

The insulated bolt 70 may include a head portion 74 and a shank portion 76 formed of metal (e.g., steel, titanium, etc.). A sleeve 78 formed of an electrically insulating material (e.g., plastic, ceramic, etc.) may surround a non-threaded portion of the shank portion 76 proximate the head portion 74, and a washer 80 formed of an electrically insulating material (e.g., plastic, ceramic, etc.) may surround the shank portion 76 and may flatly abut the head portion 74. In various embodiments the sleeve 78 and the washer 80 may be separate components or, alternatively, may be constituent parts of a single, unitary member (i.e., formed as a single piece of material). The sleeve 78 and the washer 80 may provide an electrically insulating barrier between the ring terminal 44 and the metal portions of the insulated bolt 70 and between the lower portion 14b of the fuse plate 14 and the metal portions of the insulated bolt 70. This may prevent electrical shorting between the ring terminal 44 furreule and the first stud 34a and establishes a current path through the fusible element 14c that is substantially similar to that shown in FIG. 2E.

Those of ordinary skill in the art will appreciate that the above-described embodiments of the fuse module 10 provide numerous advantages in the art. For example, the fuse module 10 may be connected directly to a jump stud of a vehicle with no flexible electrical conductors extending therebetween and may provide overcurrent protection for a vehicle's battery. Moreover, the fuse module 10 may provide such protection in a robust, compact form factor. Moreover, the fuse module 10 may be associated with relatively low manufacturing costs may therefore be implemented relatively inexpensively.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A jump stud assembly comprising:
 a housing;
 electrically conductive first and second studs extending through a floor of the housing and into a compartment defined by the housing;
 a fuse module comprising:
  a mounting block having a through-hole extending therethrough;
  a fuse plate comprising:
   an upper portion disposed on a top of the mounting block and having a through-hole aligned with the through-hole of the mounting block;
   a lower portion disposed on a bottom of the mounting block and having a through-hole aligned with the through-hole of the mounting block; and
   a fusible element disposed adjacent a sidewall of the mounting block and connecting the upper portion of the fuse plate to the lower portion of the fuse plate;
 an electrically conductive first nut threadedly engaging the first stud between the housing and a first side of the fuse module, the first nut disposed in electrical contact with the upper portion of the fuse plate; and
 an electrically conductive second nut threadedly engaging the first stud on a second side of the fuse module opposite the first side;
 wherein the fuse module is mounted on a portion of the first stud outside of the compartment, with the first stud extending through the through-holes of the upper portion of the fuse plate, the mounting block, and the lower portion of the fuse plate, and with the upper portion of the fuse plate in electrical communication with the first stud.

2. The jump stud assembly of claim 1, further comprising a removable cover enclosing the compartment.

3. The jump stud assembly of claim 1, further comprising an electrically insulating ferrule disposed on the first stud between the lower portion of the fuse plate and the second nut, the ferrule having a planar portion disposed adjacent the lower portion and a tubular shank extending through the through-hole of the lower portion and into the through-hole of the mounting block.

4. The jump stud assembly of claim 1, further comprising a tubular, torque limiting cuff disposed within the through-hole of the mounting block and extending between the upper portion of the fuse plate and the lower portion of the fuse plate, wherein the first stud extends through the torque limiting cuff.

5. The jump stud assembly of claim 4, wherein the torque limiting cuff is formed of an electrically insulating material.

6. The jump stud assembly of claim 5, wherein the torque limiting cuff is formed of ceramic.

7. A jump stud assembly comprising:
a housing;
electrically conductive first and second studs extending through a floor of the housing and into a compartment defined by the housing;
a removable cover enclosing the compartment;
a fuse module comprising:
a mounting block having a through-hole extending therethrough;
a fuse plate comprising:
an upper portion disposed on a top of the mounting block and having a through-hole aligned with the through-hole of the mounting block;
a lower portion disposed on a bottom of the mounting block and having a through-hole aligned with the through-hole of the mounting block; and
a fusible element disposed adjacent a sidewall of the mounting block and connecting the upper portion of the fuse plate to the lower portion of the fuse plate;
wherein the fuse module is mounted on a portion of the first stud outside of the compartment, with the first stud extending through the through-holes of the upper portion of the fuse plate, the mounting block, and the lower portion of the fuse plate, and with the upper portion of the fuse plate in electrical communication with the first stud;
a ring terminal of an electrical conductor disposed on the first stud in electrical contact with the lower portion of the fuse plate;
an electrically conductive first nut threadedly engaging the first stud between the housing and a first side of the fuse module, the first nut disposed in electrical contact with the upper portion of the fuse plate; and
an electrically conductive second nut threadedly engaging the first stud on a second side of the fuse module opposite the first side, the second nut holding the ring terminal in engagement with the lower portion of the fuse plate.

8. The jump stud assembly of claim 7, further comprising an electrically insulating ferrule disposed on the first stud between the ring terminal and the second nut, the ferrule having a planar portion disposed in flat engagement with the ring terminal and a tubular shank extending through the ring terminal, the through-hole of the lower portion, and into the through-hole of the mounting block.

9. The jump stud assembly of claim 7, further comprising a tubular, torque limiting cuff disposed within the through-hole of the mounting block and extending between the upper portion of the fuse plate and the lower portion of the fuse plate, wherein the first stud extends through the torque limiting cuff.

10. The jump stud assembly of claim 9, wherein the torque limiting cuff is formed of an electrically insulating material.

11. The jump stud assembly of claim 10, wherein the torque limiting cuff is formed of ceramic.

12. A jump stud assembly comprising:
a housing;
electrically conductive first and second studs extending through a floor of the housing and into a compartment defined by the housing; and
a fuse module comprising:
a mounting block having a through-hole extending therethrough;
a fuse plate comprising:
an upper portion disposed on a top of the mounting block and having a through-hole aligned with the through-hole of the mounting block;
a lower portion disposed on a bottom of the mounting block and having a through-hole aligned with the through-hole of the mounting block; and
a fusible element disposed adjacent a sidewall of the mounting block and connecting the upper portion of the fuse plate to the lower portion of the fuse plate;
wherein the fuse module is mounted to the first stud outside of the compartment, with an electrically insulated bolt extending through the through-holes of the lower portion of the fuse plate, the mounting block, and the upper portion of the fuse plate, and threadedly engaging a threaded aperture of the first stud, with the upper portion of the fuse plate in electrical communication with the first stud.

13. The jump stud assembly of claim 12, further comprising a removable cover enclosing the compartment.

14. The jump stud assembly of claim 12, wherein the insulated comprises:
a head portion;
a shank portion extending from the head portion;
a sleeve formed of an electrically insulating material surrounding a non-threaded portion of the shank portion proximate the head portion; and
a washer formed of an electrically insulating material surrounding the shank portion and flatly abutting the head portion.

15. The jump stud assembly of claim 12, further comprising a tubular, torque limiting cuff disposed within the through-hole of the mounting block and extending between the upper portion of the fuse plate and the lower portion of the fuse plate, wherein the first stud extends through the torque limiting cuff.

16. The jump stud assembly of claim 15, wherein the torque limiting cuff is formed of an electrically insulating material.

17. The jump stud assembly of claim 16, wherein the torque limiting cuff is formed of ceramic.

* * * * *